United States Patent [19]
Audi et al.

[11] Patent Number: 5,700,545
[45] Date of Patent: Dec. 23, 1997

[54] ENERGY ABSORBING STRUCTURE

[75] Inventors: Richard Francois Audi, Dearborn; Donald Scott Smith, Commerce Township; Phillip Patrick Carroll, III, Bloomfield Hills; Michael Anthony Rossi, Allen Park, all of Mich.

[73] Assignee: The Oakwood Group, Dearborn, Mich.

[21] Appl. No.: 456,079

[22] Filed: May 31, 1995

[51] Int. Cl.$^6$ .................................................. B32B 3/10
[52] U.S. Cl. .......................... 428/131; 428/135; 428/182; 428/594; 428/595; 293/133; 188/377
[58] Field of Search .......................... 428/911, 135, 428/136, 116, 594, 595, 182; 293/133; 188/377

[56] References Cited

U.S. PATENT DOCUMENTS

| | | |
|---|---|---|
| 3,871,636 | 3/1975 | Boyle . |
| 3,997,207 | 12/1976 | Norlin . |
| 4,029,350 | 6/1977 | Goupy et al. . |
| 4,190,276 | 2/1980 | Hirano et al. ............ 293/133 |
| 4,321,989 | 3/1982 | Meinzer .................. 188/377 |
| 4,352,484 | 10/1982 | Gertz et al. . |
| 4,635,981 | 1/1987 | Friton . |
| 4,666,130 | 5/1987 | Denman et al. . |
| 4,720,261 | 1/1988 | Fishwick et al. ........... 432/36 |
| 4,844,213 | 7/1989 | Travis . |
| 4,909,661 | 3/1990 | Ivey ........................ 404/6 |
| 5,165,990 | 11/1992 | Nakano .................. 428/288 |
| 5,192,157 | 3/1993 | Laturner . |
| 5,364,682 | 11/1994 | Tanaka et al. . |
| 5,500,037 | 3/1996 | Alhamad ................. 96/108 |

*Primary Examiner*—Christopher Raimund
*Attorney, Agent, or Firm*—Brooks & Kushman P.C.

[57] ABSTRACT

Disclosed is an energy absorbing structure (10) for decelerating an object that impacts the structure. The structure has at least one energy absorbing member (20). Each member includes a stranded structure such as expanded metal (22) which provides the energy absorbing structure (10) with the characteristic of energy absorption according to a near square wave characteristic.

16 Claims, 4 Drawing Sheets

ENERGY ABSORBING STRUCTURE

TECHNICAL FIELD

This invention relates to an energy absorbing structure for decelerating an object that impacts the structure.

BACKGROUND ART

Many approaches have been made to provide a structure which is able to absorb a significant percentage of the impact energy transferred when an object impacts the structure. In this field, the designer may wish to create a structure in which the kinetic energy of an object which impacts the structure is absorbed by deformation of the structure. As the object's magnitude of deceleration is reduced, so is the potential for damage or bodily injury.

To assist the vehicle designer, FMVSS specification mandate certain parameters which energy absorbing structures must exhibit when subjected to various levels of deceleration and impact forces. Within an automotive vehicle, for example, designs must accommodate a headform of 15 lbm impacting at 15 mph subjecting the headform to no more than 3 milliseconds continuous deceleration of 80 g's or more. This standard applies to vehicle designs such as a headform from the rear seat impacting a seat belt retractor mounted in an upper portion of the back of the front seat.

Prior art approaches are to be found in the use of urethanes, friable polymeric rigid foams, blocks or cells of engineered plastics, various sheet metal configurations, metal beams, honeycombed metal, and other geometric solids, plus air bags in passenger restraints. Most of these approaches, however, generally crush without absorbing a significant amount of energy for a given displacement, or deflect and then rebound in order to redirect motion. Accordingly, it would be desirable to produce a response of an energy absorbing material from initial loading to failure wherein a near "square wave" response of force versus deflection is produced.

Another design constraint is the size of deflection required to absorb a required amount of energy. Prior art structures may tend to be too big to be accommodated within the allowable space.

It is known that the impact energy of an object may be dissipated as the object hits and crushes a deformable structure or material. For example, U.S. Pat. No. 4,352,484 discloses a shear action and compression energy absorber in which energy absorbing sheets are arranged in a stacked relation to resist the impact force. Each sheet has a honeycomb structure of hexagonal cells that are filled with a deformable material. U.S. Pat. No. 4,635,981 discloses an impact attenuating body formed from multiple rows of vertically arranged compartments. U.S. Pat. No. 4,666,130 discloses an energy absorbing apparatus having expanded cells which are wrapped around a hazard. Each cell defines a longitudinal space with a cross sectional diameter that is smaller nearest the hazard and larger away from the hazard.

In light of these and other approaches to the problem of energy absorption and dissipation upon impact, the need remains for impact absorbing structures which exhibit improved characteristics over such prior art structures.

Relatedly, there is a continuing quest for improved energy absorption systems which are efficient in absorbing energy and easy to install, yet can be fabricated relatively easily at a lower cost than existing structures.

SUMMARY OF THE INVENTION

It is therefore an object of the present invention to provide an energy absorbing structure which enables significant, cost effective improvements to be realized in energy absorption characteristics over prior art structures.

It is also an object of the invention to provide an energy absorbing structure which is adapted for mounting on a vehicle so that the structure may dissipate the impact energy as an impacting object travels a selected distance after initial engagement with the structure.

It is another object of the invention to provide an energy absorbing structure including at least one energy absorbing member for arresting movement of impacting objects.

Additional objects and advantages of the present invention will be apparent from the following description considered in connection with the accompanying drawings.

DETAILED DESCRIPTION AND BEST MODES FOR CARRYING OUT THE INVENTION

Figure 1:
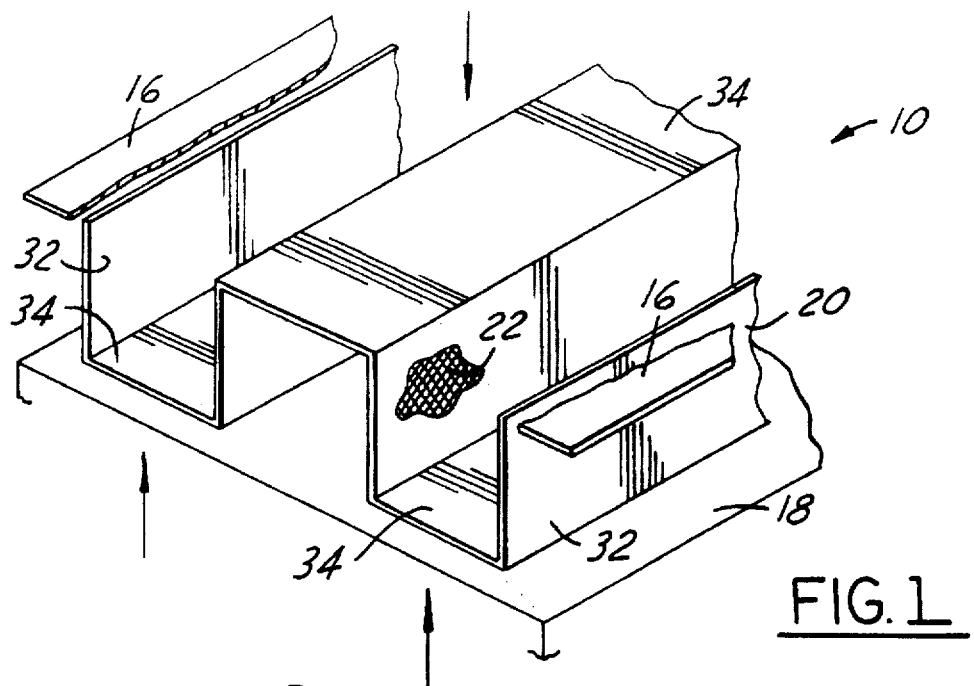
FIG. 1 depicts an energy absorbing member of an energy absorbing structure for decelerating an object that impacts the structure.
Figure 2:
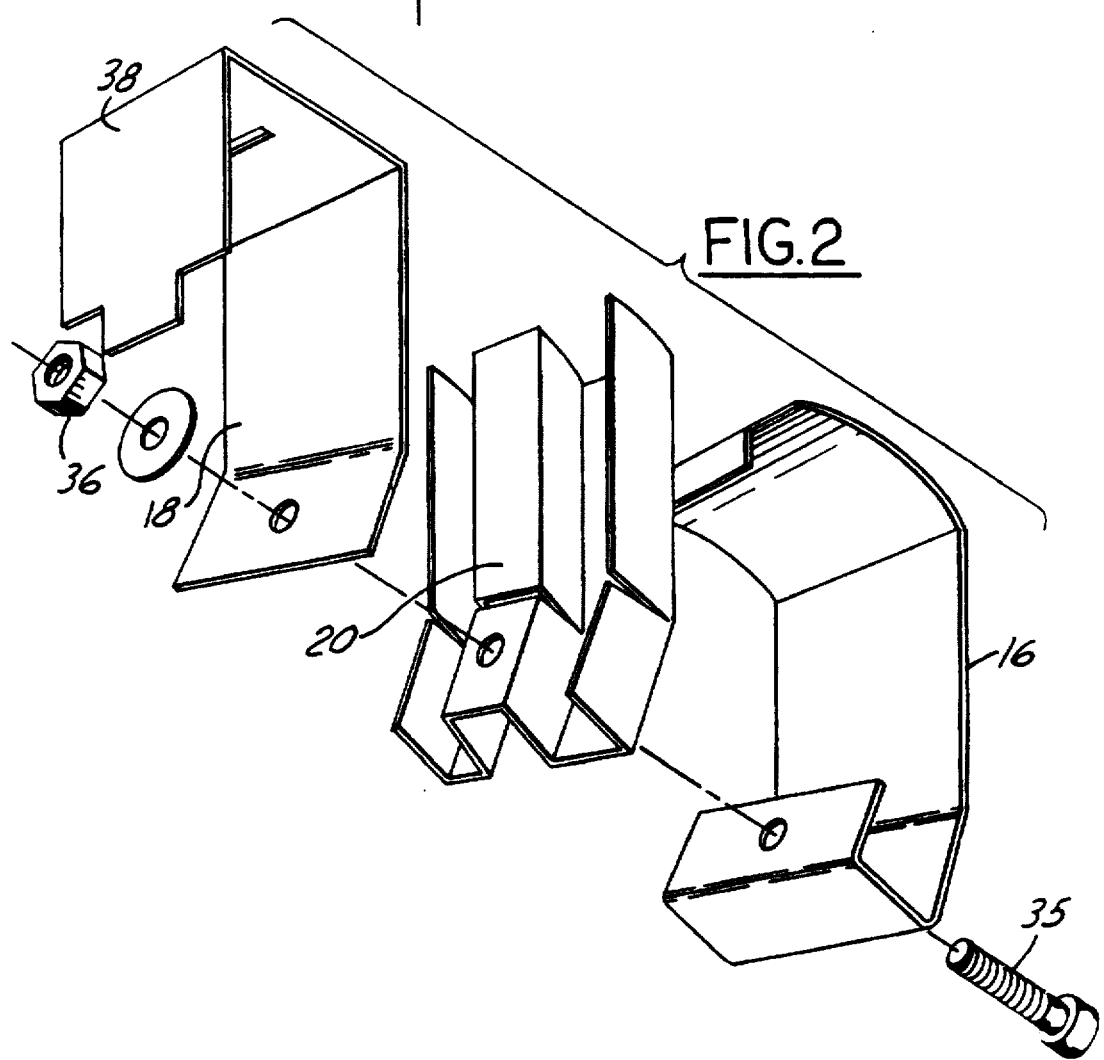
FIG. 2 is an exploded view of a preferred embodiment of the energy absorbing structure, including the energy absorbing member.
Figure 4:
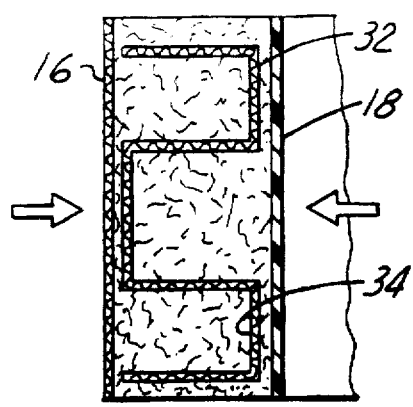
FIG. 4 is a cross-sectional view of the structure depicted in FIG. 3 taken along the line thereof.
Figure 3:
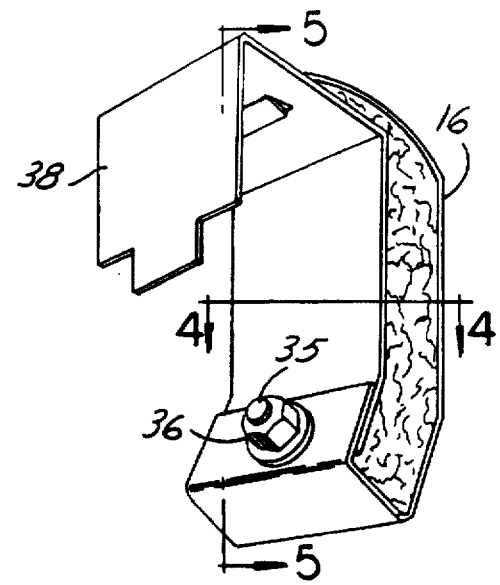
FIG. 3 is a perspective view of an assembled embodiment of the structure depicted in FIG. 2.
Figure 5:
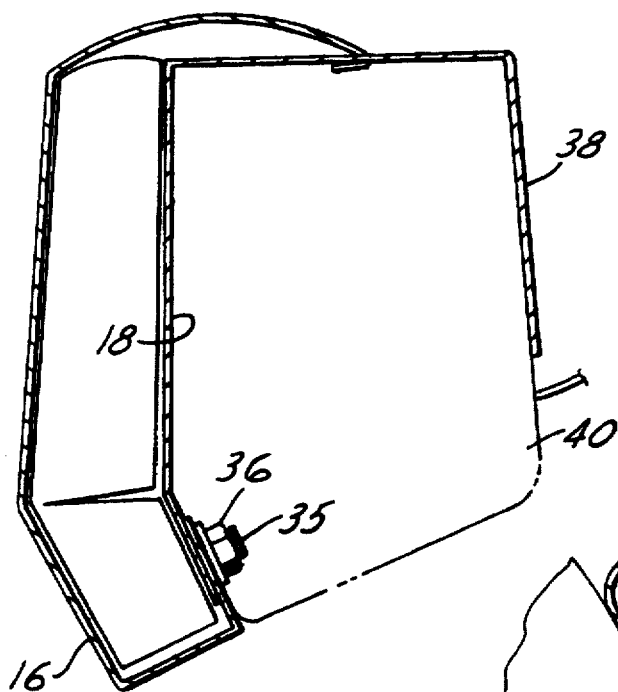
FIG. 5 is a side view of the structure depicted in FIG. 3 when mounted with a housing for a seat belt retractor.
Figure 6:
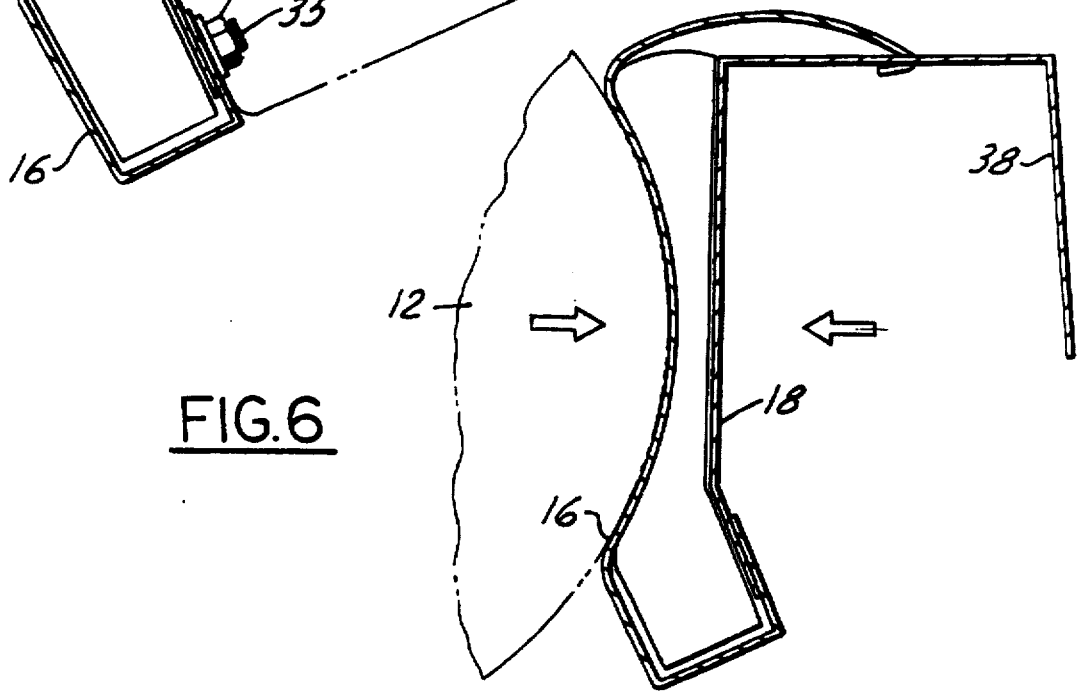
FIG. 6 illustrates a partially deformed energy absorbing structure during intermediate stages of energy absorption.

Turning first to FIGS. 1–6 of the drawings, there is depicted an energy absorbing structure generally denoted by the reference numeral 10 for decelerating an object (not shown) that impacts the structure. Included in a preferred embodiment is an incident surface 16 that meets the impacting object. Located distally in relation to the object is a basal surface 18 that is spaced apart from the incident surface 16.

At least one energy absorbing member 20 is sandwiched between the incident 16 and basal 18 surfaces. Each member 20 includes a stranded structure such as expanded metal 22 which provides the structure with the characteristic of energy absorption. It will be apparent to those of skill in the art that the stranded structure could be formed from etched, cast, mechanically perforated, or other forming processes applied to materials. Accordingly, the term "stranded structure" is meant to encompass these and their equivalent structures.

Although the preferred embodiment includes the incident 16 and basal 18 surfaces, alternate embodiments may not require such surfaces. In such alternate embodiments, the energy absorbing structure includes one or more energy absorbing members 20.

During compression of the expanded metal 22, the force absorbed per unit of displacement of the energy absorbing member rises upon impact. Thereafter, the force absorbed remains substantially constant while the kinetic energy of the object is dissipated. Thus, the displacement-load curve assumes a near square wave characteristic, as suggested by the aluminum honeycomb and expanded metal curves of FIG. 9.

Figure 9:
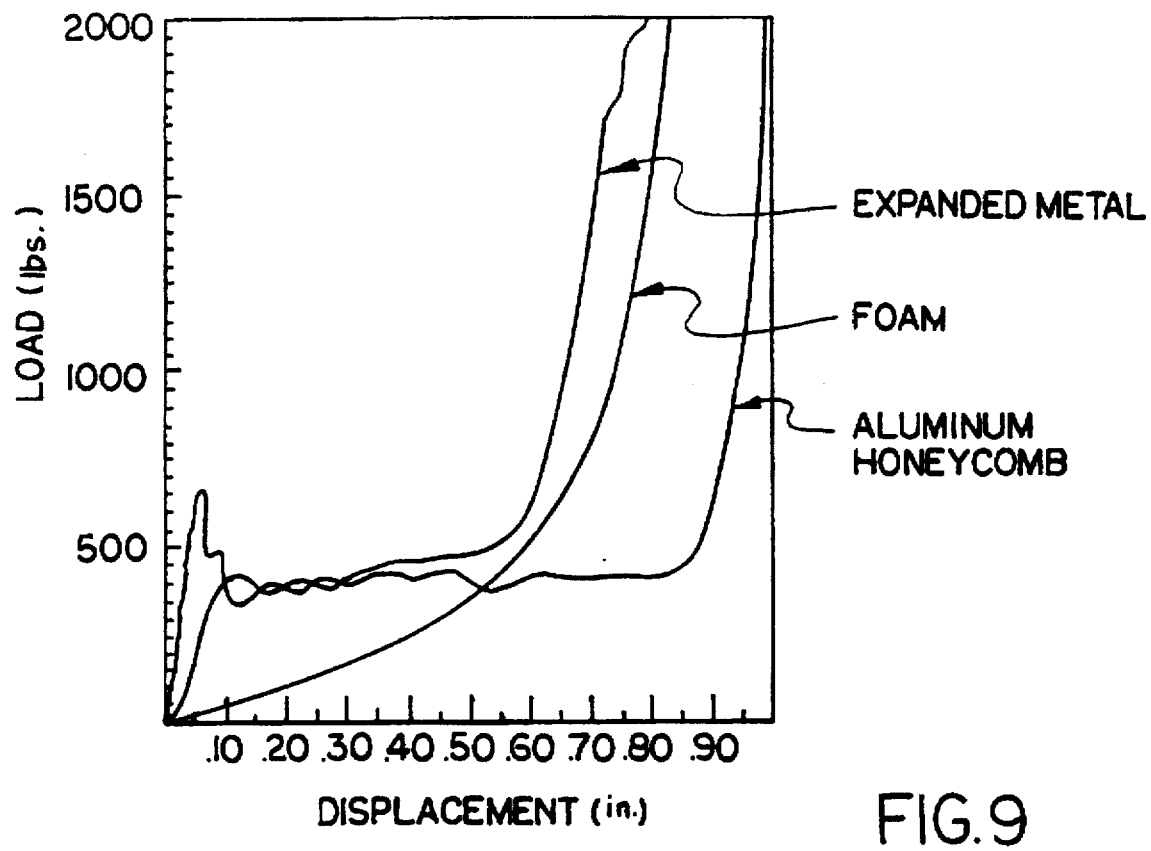
FIG. 9 is a displacement-load graph for various materials, including the expanded metal material which is a preferred embodiment of the energy absorbing member of the present invention.

Such characteristics are depicted by the graph of FIG. 9. In that Figure, there is depicted for illustration the load-displacement characteristics of a specimen of 3/16"-22 gauge expanded metal hexagonal structure. Upon inspection, it can be observed that the force absorbed per unit of displacement rises upon impact. The load remains substantially constant over a displacement of 0.10–0.50 inches during compression of the expanded metal. For comparison, FIG. 9 also depicts the displacement-load characteristics of an aluminum honeycomb structure. The "spike" in load common to aluminum honeycomb can adversely decelerate the object such that, in many cases, the honeycomb must be precrushed. A foam energy absorbing cushion is also shown in FIG. 9 which displays typical relatively inefficient energy absorption in comparison to a desired "square wave".

The expanded metal 22 of which the energy absorbing member 20 is formed is available from sources such as the McNichols Company of Tampa, Flor. The material is available in numerous styles and can be constructed of various materials, depending upon the desired energy absorption characteristics of the structure. Representative materials include carbon steel, ASTM-F-1267-9-1, HD galvanized steel, aluminum (5005 H 34), stainless steel type 304, stainless steel type 316, and the like. If desired, a protective coating can be applied to the expanded metal to provide corrosion resistance.

The expanded metal of the energy absorbing structure of the present invention is prepared by selective cutting and shearing to produce an array of strands of metal. Local work hardening is engendered by this process which may be decreased by annealing or other heat treatment.

Figure 10:
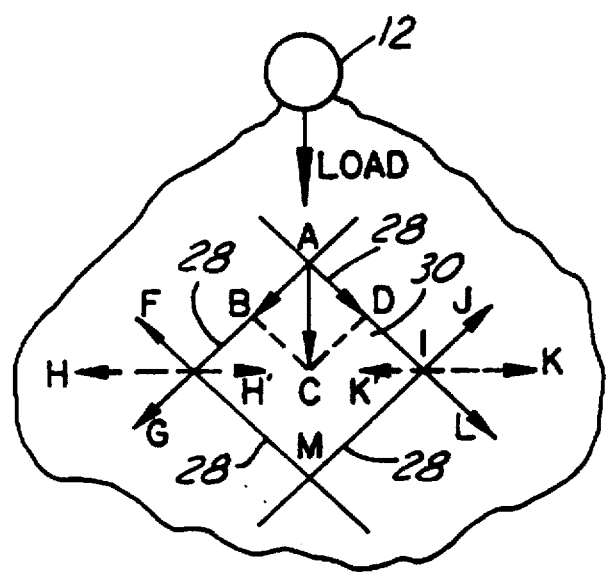
FIG. 10 is a schematic force diagram to facilitate an understanding of the deformation performance exhibited by the energy absorbing member.

FIG. 10 depicts a diamond-shaped aperture representative of those in expanded metal. Apertures may be polygonal having any number of sides with the sides being curved or straight in the diamond-shaped case, four strands of metal 28 are depicted. As an object 12 impacts the incident surface 16, forces are transmitted to the energy absorbing member 20 (FIG. 1). Impact forces are initially absorbed by the expanded metal of which support walls or faces 32 are formed. Such faces in the embodiment shown are disposed perpendicularly to the incident 16 and basal surfaces 18. In other embodiments, the support faces 32 may be inclined in relation to each other. As illustrated, the inclined faces 32 are connected by alternating spacing planes or faces 34. The effect is to impart a crenelated appearance to the energy absorbing member 20.

It should be appreciated that the energy absorbing member positioned between the incident and basal surfaces may be formed of faces which are other than orthogonal. Other configurations may include a generally sinusoidal or hexagonal configuration, and their equivalents.

It should also be recognized that there may be more than one energy absorbing member either alone, or sandwiched between the incident and basal surfaces. If desired, interstices formed thereby may be occupied by a gaseous, polymeric, or foam (e.g. urethane foam) material dispersed therewithin. Impregnation of such substances within the interstices of the energy absorbing structure improves wall buckling resistance, dampens and holds member components of the structure together during assembly. Various materials may also be placed interstitially to provide rebound if desired including metal springs and polymers exhibiting some elasticity, etc. If desired, the energy absorbing structure could be surrounded by a FREON or other gasses. In such structures, the incident and basal surfaces may be formed from opposing sides of an elastomeric bag which encapsulates the gas.

Returning now to FIG. 10, there is depicted an object 12 that generates a load which is transmitted toward an apex A of a cell in the array of expanded metal. A representative diamond-shaped aperture 30 formed by four strands 28 of the expanded metal is depicted. The load is generally depicted by the vector AC which is resolved into component vectors AB and AD. The component AB is resisted by an inwardly directed force H' having a component EB. Thus, the action of force AB is met by the reaction of force EB. Support for EB is provided by the reaction of an adjacent cell which generates forces FE and GE.

The actual deformation mechanics on a microstructural or finite element analysis are more detailed and/or complex. It should be recognized that the disclosed invention encompasses all possible strand conformations and deformation mechanics.

Similar constraints are imposed at opposing corners I and M. Thus, the lattice or array of cells cooperate to provide a progressive reaction to the impact forces generated by a collision of the object 12 with the energy absorbing structure 10.

As compression proceeds, the diamond-shaped apertures 30 become flattened in an analogous manner to that of the bellows of an accordion or concertina upon being squeezed. Ultimately, however, the array is no longer able to absorb the impact forces. At that point, the apertures become collapsed and the array is unable to provide further yield with which to absorb the impact forces. Nevertheless, during energy absorption, the force absorbed has remained substantially constant during compression of the expanded metal while the kinetic energy of the object is converted into potential energy.

Figure 7:
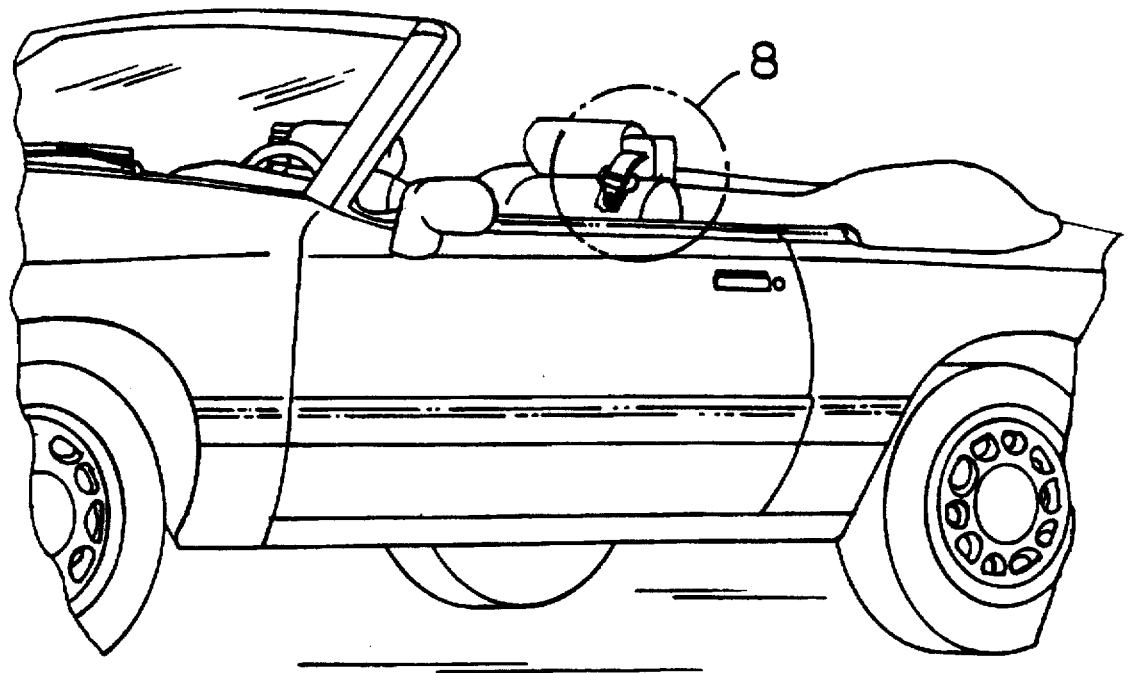
FIG. 7 is an environmental view of an application of the energy absorbing structure as mounted adjacent to a head restraint of a seat in a vehicle.
Figure 8:
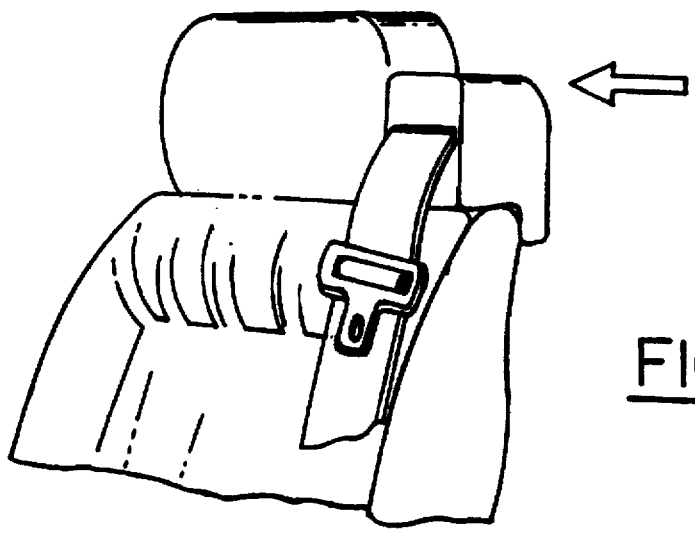
FIG. 8 is a more detailed view of a portion of the application depicted in FIG. 7.

FIGS. 7–8 depict an illustrative embodiment of the energy absorbing structure of the present invention. When mounted as shown in these Figures, the energy absorbing structure may accommodate an ancillary device such as a seat belt retractor in a housing which is mounted adjacent to a head restraint that is in turn mounted atop the seat of a vehicle. If the vehicle were involved in a collision, the forward movement of a rear seat passenger may cause impact between the passenger and the energy absorbing structure. Upon impact, the chances for bodily injury are lessened by virtue of the disclosed structure.

Continuing with reference to FIGS. 2–6, there is depicted a representative means for attaching 20 (FIG. 2) so that at least two of the incident surface, the energy absorbing member, and the basal surface are unable to become separated during energy absorption. In this way, the energy absorbing structure remains reasonably attached to the ancillary device. A means for accommodating 38 is provided extending from the basal surface 16 whereby an ancillary device such as a seat belt retractor housing may be connected to the energy absorbing structure.

It will be appreciated in light of the present disclosure that the energy absorbing structure of this invention may be applied to various automobile components: side impact energy absorbers; knee bolsters; steering wheel and column energy absorbers; bumpers for low speed impacts; front and rear crash absorbers for high speed impacts; interior panels (door, instrument, pillar, headliner); engine crash restraints; seat belt restraints (to allow the belt to "give" on impact, i.e. feed out of the housing after reaching a maximum force); and bottoming out suspension protectors.

In the aviation field, the energy absorbing structure may be used for arresting gear and landing gear plus interior energy absorbers to protect occupants. In the sports arena and other personal protection equipment markets, the disclosed structure may usefully be embodied in head gear (helmets for football, hockey, etc.); teeth guards; and knee, hip, elbow and shoulder pads. The disclosed invention also finds utility in shipping carton protectors which would replace or supplement existing foams. Further, the energy absorbing structure could be used as a mounting for earthquake-resistant buildings and structures (bridges, pillars, etc.)

In one set of experiments, the quantitative results shown in Table I were obtained. Qualitative pass/fail outcomes are also shown under the test conditions described.

to define a plurality of apertures between the strands before deformation, the strands becoming coalesced and the apertures becoming closed during energy absorption.

2. An energy absorbing structure according to claim 1 further comprising:

a filler material disposed at least partially within the at least one energy absorbing member, the filler material being selected from a group consisting of a polymeric material, a foam, a gas, and mixtures thereof.

3. An energy absorbing structure according to claim 1 wherein the at least one energy absorbing member comprises a single energy absorbing member.

4. An energy absorbing structure according to claim 1 wherein each of the at least one energy absorbing members comprises:

a plurality of supporting faces extending between the incident and basal surfaces.

5. An energy absorbing structure according to claim 4 wherein each of the at least one energy absorbing members comprises:

a plurality of spacing faces disposed between the supporting faces.

TABLE I

IRS SEAT BELT RETRACTOR ENERGY ABSORBER
Rear Passenger Impact Testing

| Test | Cover ID | Cover Shell Matl | Absorbing Material | Absorber Thickness in | Absorber Conformation | Max Accel g's | Max Force lbf | Max Deflec (impact dir) mm | Result |
|---|---|---|---|---|---|---|---|---|---|
| 45 DEGREE DOWNWARD IMPACT CENTERED ON BOLT AT BOTTOM OF RETRACTOR | | | | | | | | | |
| 1 | None | None | None | 0 | None | 103 | 1553 | 23 | Fail |
| 10 | 9 | Ptn 26 | Foam | 1.25 | Rectangular block | 91 | 1373 | 20 | Fail |
| 14 | 14 | Ptn 26 | 3/16–22/foam | 1 | Three .8" rect channels, 1 foamed | 72 | 1082 | 22 | Pass |
| 45 DEGREE DOWNWARD IMPACT CENTERED ON TOP CORNER OF RETRACTOR | | | | | | | | | |
| 2 | None | None | None | 0 | None | 140 | 2104 | 31 | Fail |
| 3 | F2 | Ptn 26 | 3/16–22/foam | 1 | Three .8" rect channels, 2 foamed | 73 | 1103 | 21 | Pass |
| HORIZONTAL IMPACT CENTERED MID-RETRACTOR | | | | | | | | | |
|  | None | None | None | 0 | None | 59 | 895 | 62 | Pass |
| SPECIFICATION/GOALS | | | | | | | | | |
|  |  |  |  |  |  | <80 | <1200 |  |  |

While the best mode for carrying out the invention has been described in detail, those familiar with the art to which this invention relates will recognize various alternative designs and embodiments for practicing the invention as defined by the following claims.

What is claimed is:

1. An energy absorbing structure for decelerating an object that impacts the structure, comprising:

an incident surface that meets the impacting object;

a basal surface that contacts a member to be protected and is located in spaced relation to the incident surface;

at least one energy absorbing member located between the incident and basal surfaces for supporting deformation of the structure, the energy absorbing member including a planar stranded structure of expanded metal that collapses during energy absorption and is oriented substantially perpendicular to the incident surface to maximize energy absorption in a given distance, wherein the stranded structure comprises an array of interconnected strands of metal, the strands intersecting 6. An energy absorbing structure according to claim 1 wherein the apertures are polygonal before impact of the object.

7. An energy absorbing structure according to claim 1 wherein the apertures are diamond-shaped before impact of the object.

8. An energy absorbing structure according to claim 1 wherein the apertures are hexagonal before impact of the object.

9. An energy absorbing structure according to claim 1 further comprising:

means for attaching together at least two of the incident surfaces, the at least one energy absorbing member, and the basal surface so that during energy absorption, they are unable to separate.

10. An energy absorbing structure according to claim 1 further comprising:

means for accommodating an ancillary device.

11. An energy absorbing structure according to claim 1 further comprising:

means for accommodating an ancillary device, the accommodating means being connected to the basal surface.

12. An energy absorbing structure according to claim 1, wherein the stranded structure absorbs energy in a near square wave manner.

13. An energy absorbing structure for decelerating an object that impacts the structure, comprising:
- at least one energy absorbing member including a planar stranded structure of expanded racial that collapses during energy absorption and is oriented substantially perpendicular to the incident surface to maximize energy absorption in a given distance;
- wherein the stranded structure comprises an array of interconnected strands of metal, the strands intersecting to define a plurality of apertures between the strands before deformation, the strands becoming coalesced and the apertures becoming closed during energy absorption;
- an incident surface that meets the impacting object;
- a basal surface that is located in spaced relation to the incident surface, the at least one energy absorbing member being located between the incident and basal surfaces for supporting deformation of the member; and
- means for accommodating an ancillary device, the accommodating means being connected to the basal surface;
- wherein the ancillary device is a seat belt retractor mechanism.

14. An energy absorbing structure for decelerating an object that impacts the structure, comprising:
- an incident surface that meets the impacting object;
- a basal surface that contacts a member to be protected and is located in spaced relation to the incident surface;
- at least one energy absorbing member located between the incident and basal surfaces, each energy absorbing member including a planar stranded structure of folded expanded metal that is oriented substantially perpendicular to the incident surface, wherein the force absorbed per unit of displacement of the member rises upon impact while the stranded structure is initially compressed and remains substantially constant thereafter, and wherein the stranded structure comprises an array of interconnected strands of metal, the strands intersecting to define a plurality of apertures between the strands before deformation, the strands becoming coalesced and the apertures becoming closed during energy absorption.

15. An energy absorbing structure according to claim 14, wherein the stranded structure absorbs energy in a near square wave manner.

16. An energy absorbing structure for decelerating an object that impacts the structure, comprising:
- an incident surface that meets the impacting object;
- a basal surface that contacts a member to be protected and is located in spaced relation to the incident surface; and
- at least one energy absorbing member located between the incident and basal surfaces for supporting deformation of the structure, the energy absorbing member including a planar stranded structure of expanded metal that collapses during energy absorption and is oriented substantially perpendicular to the incident surface to maximize energy absorption in a given distance;
- wherein the expanded metal is selected from the group consisting of carbon steel, ASTM-F1267-9-1, HD galvanized steel, aluminum (5005 H 34), stainless steel type 304, and stainless steel type 316, and wherein the stranded structure comprises an array of interconnected strands of metal, the strands intersecting to define a plurality of apertures between the strands before deformation, the strands becoming coalesced and the apertures becoming closed during energy absorption.

* * * * *